United States Patent
Friedman et al.

(10) Patent No.: US 7,096,326 B1
(45) Date of Patent: Aug. 22, 2006

(54) REGISTRY MONITORING SYSTEM AND METHOD

(75) Inventors: George Friedman, Austin, TX (US); Robert Phillip Starek, Austin, TX (US); Carlos A. Murdock, Austin, TX (US)

(73) Assignee: Pinion Software, Inc., Austin, TX (US)

( * ) Notice: Subject to any disclaimer, the term of this patent is extended or adjusted under 35 U.S.C. 154(b) by 880 days.

(21) Appl. No.: 09/701,200

(22) PCT Filed: Sep. 29, 2000

(86) PCT No.: PCT/US00/26844

§ 371 (c)(1),
(2), (4) Date: Nov. 27, 2000

(87) PCT Pub. No.: WO01/25953

PCT Pub. Date: Apr. 12, 2001

(51) Int. Cl.
*G06F 12/00* (2006.01)
*G06F 7/00* (2006.01)
*G06F 15/16* (2006.01)

(52) U.S. Cl. .......................... 711/154; 709/201; 707/3
(58) Field of Classification Search ................ 711/100, 711/147, 152, 154, 163, 150, 151, 8, 9, 10, 711/201, 203; 74/150, 151; 709/201; 707/201, 707/203, 3, 9, 10, 8
See application file for complete search history.

(56) References Cited

U.S. PATENT DOCUMENTS

| 5,774,668 | A | | 6/1998 | Choquier et al. ...... 395/200.53 |
| 5,956,489 | A | | 9/1999 | San Andres et al. .... 395/200.51 |
| 5,974,409 | A | | 10/1999 | Sanu et al. ..................... 707/3 |
| 5,983,270 | A | * | 11/1999 | Abraham et al. ........... 709/224 |
| 6,038,563 | A | * | 3/2000 | Bapat et al. ................... 707/10 |
| 6,085,191 | A | * | 7/2000 | Fisher et al. .................... 707/9 |
| 6,553,466 | B1 | * | 4/2003 | Friedman et al. ........... 711/152 |

OTHER PUBLICATIONS

David A. Solomon, Inside Windows NT 1998, Microsoft Press, second Edition, pp. 305-319.*

* cited by examiner

*Primary Examiner*—Tuan V. Thai
(74) *Attorney, Agent, or Firm*—DLA Piper Rudnick Gray Cary US LLP

(57) ABSTRACT

A registry monitoring method particularly applicable to a system (100) in which protected data is transmitted to a recipient computer. The method comprises requesting a handle for a registry key to a calling process, requesting a registry key value for the handle, modifying and deleting keys and values of protected data locations, and obtaining security clearance to complete the requests by checking secured process lists and rejection lists. Also included are a registry monitoring system, a secured data transmission system including registry monitorings, a machine-readable medium comprising a program to monitor a registry (110), and a computer configured to monitor a registry (110).

30 Claims, 2 Drawing Sheets

REGISTRY MONITORING SYSTEM AND METHOD

FIELD OF THE INVENTION

The invention relates to the protection of data stored in a computer, and more particularly to data which has been imported from an outside source.

BACKGROUND OF THE INVENTION

A registry is a hierarchical repository for configuration data. The terms "information" and "data" as used herein are each intended to include the broadest definition of the other, and each include text, audio and video data. By way of further example, the term "information" can mean raw data, processed data, or a combination of raw and processed data. The registry may keep track of all software stored on the computer, and the relationship between programs. The registry may keep track of a plurality of users and hardware configurations. Preferences may vary among the plurality of users.

Each piece of data in the registry has a key-value associated with it. Together the name and value is referred to as a value entry. A key is analogous to a folder and may itself contain one or more folders, which may be referred to as subkeys, and one or more name-value pairs. The key may also be referred to as a name or a handle. To access the data and retrieve the stored value the correct key is needed.

Because the registry is a database, and thus, is a data storage location, it may be exploited for leaking data. "Leaking data" as used herein means transferring data out of a system in which it is desired to have the data secured. A process may write information to the registry, for example, for temporary storage. Another process may then access the information from the registry and write the data to a registry key. Another process may then read the data from the registry key and write it to a disk or other storage device, thereby leaking data. Accordingly, for applications wherein data security is important, there is a need to limit data leakage from the registry.

SUMMARY OF THE INVENTION

The invention discloses a registry monitoring method particularly applicable to a system in which protected data is transmitted to a recipient computer. An illustrative embodiment of the invention comprises requesting a handle for a registry key to a calling process, requesting a registry key value for the handle, modifying and deleting keys and values of protected data locations, and obtaining security clearance to complete the requests by checking secured process lists and rejection lists.

Further disclosed are a registry monitoring system, a secured data transmission system including registry monitoring, a machine-readable medium comprising a program to monitor a registry, and a computer configured to monitor a registry.

DESCRIPTION OF THE DRAWINGS

The invention is best understood from the following detailed description when read with the accompanying figures.

DETAILED DESCRIPTION OF THE INVENTION

Embodiments of the invention disclosed comprise a method and system for monitoring a registry and may reduce or eliminate data leakage from the registry. The invention secures processes to deny data transfer to non-visual aspects of the system. This includes, for example, restricting writing to a file system, transferring data over communication ports, sharing memory with other processes and writing data to the registry.

An exemplary embodiment of the registry monitoring method comprises requesting a handle for a registry key to a calling process, requesting a registry key value for the handle, and obtaining security clearance to complete the requests by checking secured process lists and rejection lists. Because the ability to add to the registry is blocked, the ability to delete from the registry is also blocked. Therefore, the system includes a method for modifying and deleting keys and values with a security check incorporated therein.

The registry monitoring method of the present invention is best described as it may be carried out on a computer implemented secured data transmission system. An illustrative example of such a system comprises two main components, a data packager and a receiver. The packager is used to create packages that carry file content to target recipients. The receiver runs on a recipient computer to allow access to packaged file content.

Figure 1:
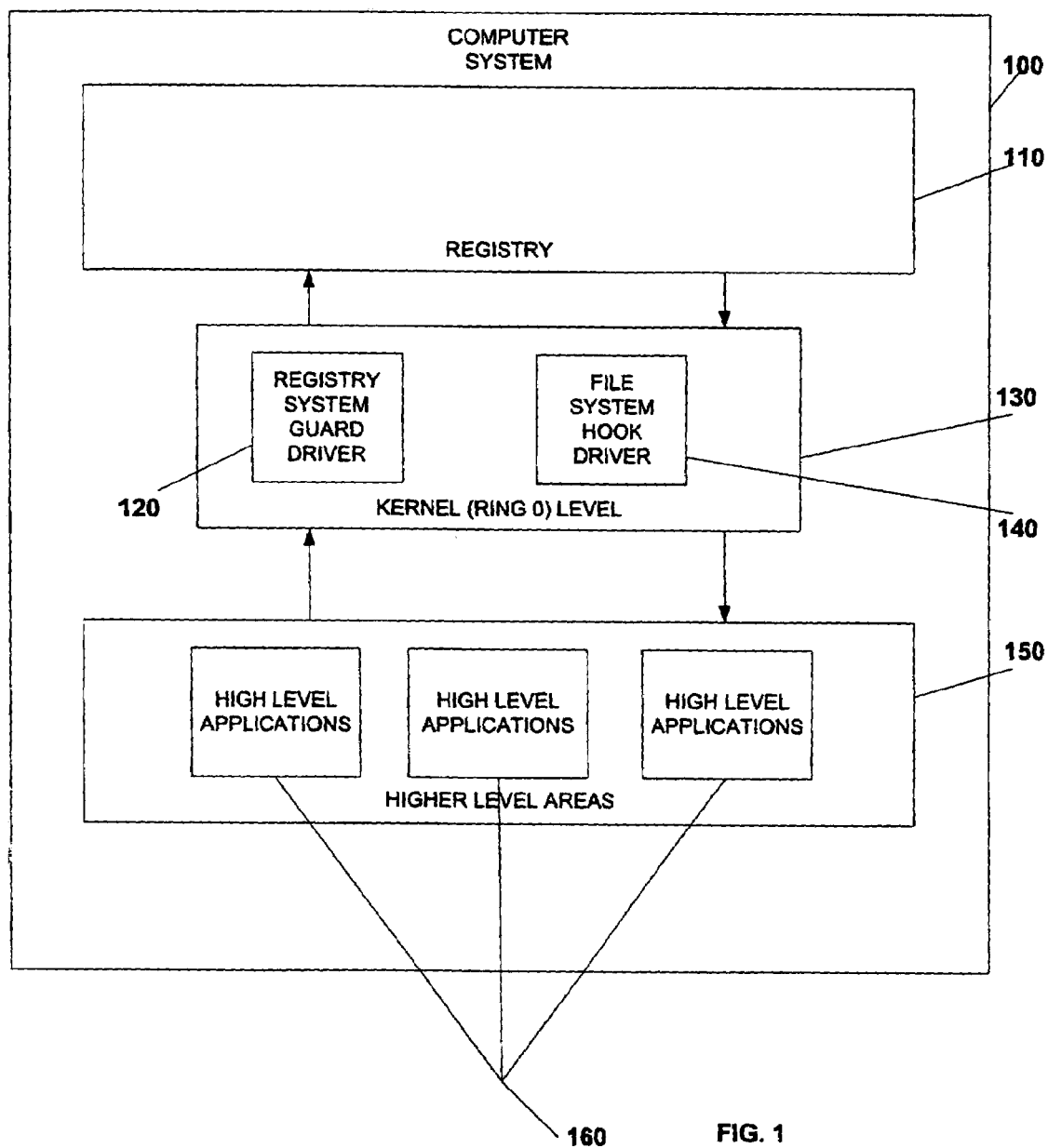
FIG. 1 is a diagram of a portion of a computer system according to an illustrative embodiment of the invention.

FIG. 1 depicts an illustrative computer system 100 according to an embodiment of the invention. A registry entry guard driver 120 is in communication with file system hook driver 140. Both drivers exist on the kernel (ring 0) level 130. Applications 160 run on higher levels 140. When applications 160 request access to registry 110, guard driver 120 in conjunction with hook driver 140 monitors and handle the requests.

A package carries data and provides associated information to a command center which is a component of an application programming interface, such as a Win32 process. A communication driver handles communication between the application programming interface and a plurality of device drivers. It provides a single set of device driver I/O control functions that are called from the application programming interface to send information to or retrieve information from the device drivers. The communication driver is called by a hook driver to notify the command center that a process is trying to open a packaged file. The device drivers, together with the application programming interface, marshal the packaged content into a vault and support access to the content, subject to an originator's permission selection. The command center may watch for packages to be executed and prompt users for file names to save a package payload. It may notify the file system hook driver that a package payload should be absorbed into the vault. It may present users with dialog indicating that an application is attempting to open a packaged file. It may also notify device drivers 106 when applications exit. The command center may block clipboard access and terminate applications at the request of a permissions device driver when permissions expire. Permission information is contained in a database and may include, for example, file names, package ID, file system ID and file permissions. File permissions may include, but are not limited to, length of time or number of times a file may be open, date after which a file may no longer be opened, and printing and clipboard permissions.

File system hook driver 140 obtains a data request initiated from a user who is looking to access a packaged or absorbed file. When hook driver 140 receives the requests it performs a security check on the process and then queries the user. The process is then added to a secured process list. The registry monitor is notified that the process is secured so it may block access in the future.

Figure 2A:
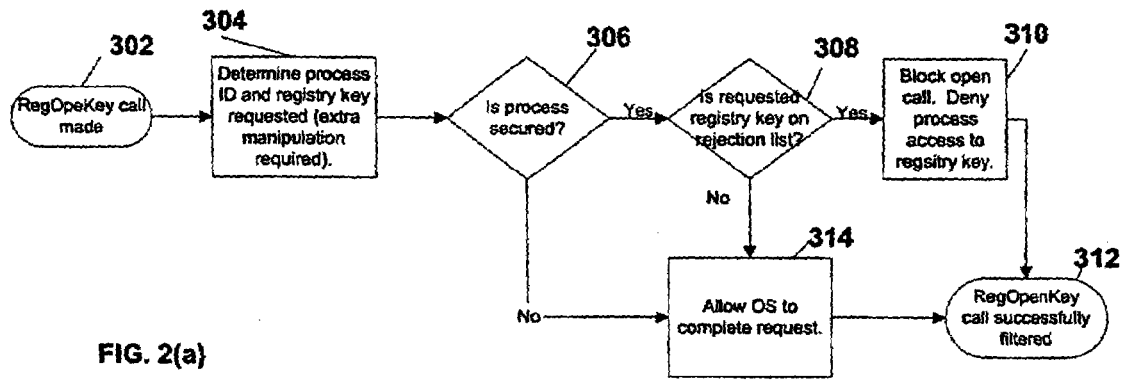
FIGS. 2 A–C are flow charts of a registry monitoring system according to an illustrative embodiment of the invention.
Figure 2B:
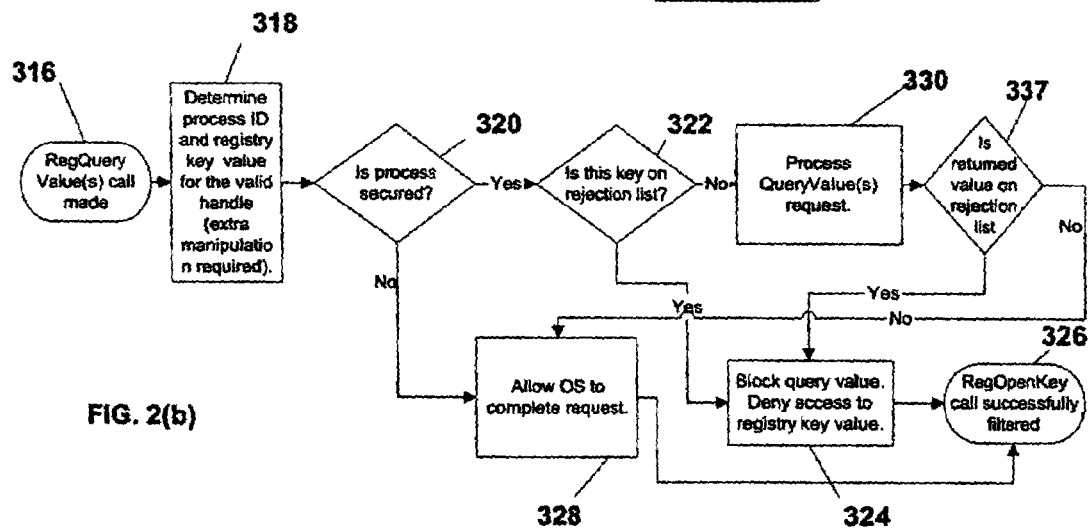
Figure 2C:
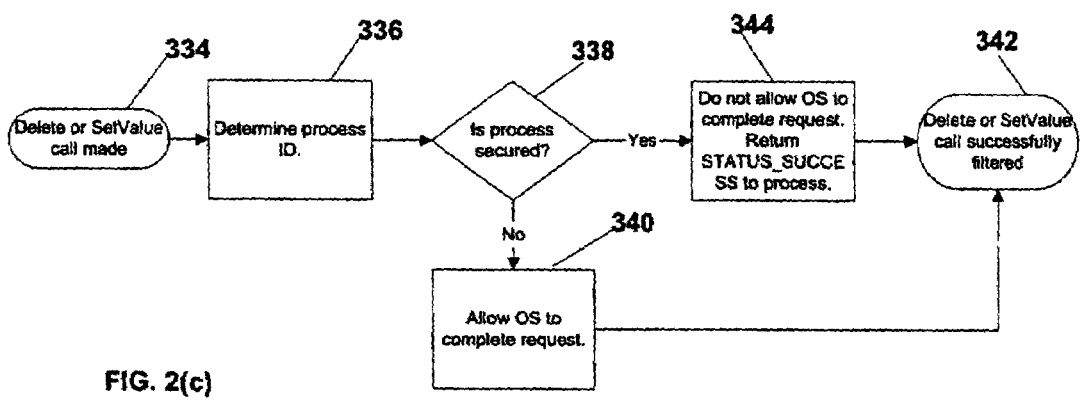

FIGS. 2 A–C depict an illustrative embodiment of the invention. Those skilled in the art will understand that variations on the registry monitoring system that include security checks to block access to keys and values are equivalent to the steps described herein, and thus, are within the spirit and scope of the invention. FIG. 2A depicts an illustrative filtering sequence for a registry open key call. The call is made to obtain a handle for a registry key to a calling process. The registry key handle call is made in step 302. In step 304 a process ID and registry key are determined. Based on this information it is determined in step 306 whether the process is secured by checking a secured process list. The secured process list is continually updated as processes successfully request secured data from the hook driver and process quit calls are initiated. If the process is secured, then in step 308 it is determined whether the registry key is on a rejection list. If the registry key is on the rejection list, the process is denied access to the registry key in step 310 and the call is successfully filtered in step 312. If the process is not on the secured list or if the registry key name is not on the rejection list, then in step 314 the request is completed and the call is successfully filtered in step 312.

FIG. 2B is an illustrative flow chart for a registry key value call filtering sequence. A registry key value for the handle is requested in step 316. The process ID and registry key name are determined in step 318. In step 320 the secured process list is again consulted to determine whether the process is secured. If the process is secured, it is determined in step 322 whether the registry key is on a rejection list. If the registry key is on the rejection list, the process is denied access to the registry key value in step 324, and the call is successfully filtered in block 326. If the process is not on the secured list, the request is completed in step 328, and the call is successfully filtered in block 326. If the registry key is not on the rejection list and the process is on the secured process list, the value request is processed in step 330 and it is determined whether the value is on the rejection list in step 332. If the value is not on the rejection list the request is allowed to be completed in step 328, and the call is successfully filtered in block 326. If the value is on the rejection list then in step 324 access is denied to the registry key value, and the call is successfully filtered in block 326.

Handles and values may then be deleted or modified. An exemplary flow chart for a deletion or modification sequence is depicted in FIG. 3C. A delete or set-value call is made in step 334. The process ID is then determined in step 336. In step 338 it is then determined whether the process is secured by checking whether the process is on the secured process list. If the process is not on the secured process list, the request is completed in step 340 and the call is successfully filtered in step 342. If the process is on the secured process list, the request is not allowed to be completed in step 344 and the call is successfully filtered in step 342.

Further disclosed is a registry monitoring system wherein the registry is monitored according to methods described herein. Additionally, an embodiment of the invention includes a computer configured to monitor a registry according such methods. The terms "computer" or "computer system" as used herein include any device capable of receiving, transmitting, and/or using information, including, without limitation, a processor, a microprocessor, a personal computer, such as a laptop, palm PC, desktop or workstation, a network server, a mainframe, an electronic wired or wireless device, such as for example, a telephone, an interactive television or electronic box attached to a television, such as for example, a television adapted to be connected to the Internet, a cellular telephone, a personal digital assistant, an electronic pager, and a digital watch In an illustrative example information is transmitted in the form of e-mail. Embodiments of the invention still further include a machine-readable medium comprising a program to monitor a registry according to methods described herein.

While the invention has been described by illustrative embodiments, additional advantages and modifications will occur to those skilled in the art. Therefore, the invention in its broader aspects is not limited to specific details shown and described herein. Modifications, for example, to steps for obtaining security clearance to complete requests, may be made without departing from the spirit and scope of the invention. Accordingly, it is intended that the invention not be limited to the specific illustrative embodiments but be interpreted within the full spirit and scope of the appended claims and their equivalents.

What is claimed is:

1. A method of monitoring a registry comprising:
   requesting a handle for a registry key to a calling process;
   requesting a registry key value for the handle; and
   obtaining security clearance to complete the requests, wherein at least one security clearance parameter has an adjustable threshold, said threshold being adjustable by a system command in association with one or more of the requests, and wherein obtaining said security clearance includes:
   (i.) determining a process ID and registry key value;
   (ii.) determining whether the process is secured by checking a secured process list;
   (iii.) if the process is secured, determining whether the registry key is on the rejection list;
   (iv.) if the registry key is on the rejection list, denying the process access to the registry key value;
   (v.) if the process is not on the secured list, completing the request;
   (vi.) if the registry key is not on the rejection list and the process is on the secured process list, processing the value request and determining whether the value is on the rejection list;
   (vii.) if the value is not on the rejection list, allowing the request to be completed; and
   (viii.) if the value is on the rejection list, denying access to the registry key value.

2. The method of claim 1 further comprising after requesting a handle for a registry key to a calling process:
   determining a process ID and registry key;
   determining whether the process is secured by checking a secured process list;
   if the process is secured, determining whether the registry key is on a rejection list;
   if the registry key is on the rejection list, denying the process access to the registry key; and
   if the process is not on the secured list or if the registry key name is not on the rejection list, completing the request.

3. The method of claim 1 further comprising after modifying and deleting handles and values:

determining a process ID;
determining whether the process is secured by checking whether the process is on a secured process list;
if the process is not on the secured process list, completing the request; and
if the process is on the secured process list, not allowing the request to be completed.

4. A registry monitoring system wherein the registry is monitored by a method comprising:
requesting a handle for a registry key to a calling process;
requesting a registry key value for the handle; and
obtaining security clearance to complete the requests, wherein at least one security clearance permission has an adjustable thresholds, wherein said threshold is reestablished in association with one or more of the requests, and wherein obtaining said security clearance includes:
(i.) determining a process ID and registry key value;
(ii.) determining whether the process is secured by checking a secured process list;
(iii.) if the process is secured, determining whether the registry key is on the rejection list;
(iv.) if the registry key is on the rejection list, denying the process access to the registry key value;
(v.) if the process is not on the secured list, completing the request;
(vi.) if the registry key is not on the rejection list and the process is on the secured process list, processing the value request and determining whether the value is on the rejection list;
(vii.) if the value is not on the rejection list, allowing the request to be completed; and
(viii.) if the value is on the rejection list, denying access to the registry key value.

5. The registry monitoring system of claim 4 further comprising after requesting a handle for a registry key to a calling process:
determining a process ID and registry key;
determining whether the process is secured by checking a secured process list;
if the process is secured, determining whether the registry key is on a rejection list;
if the registry key is on the rejection list, denying the process access to the registry key; and
if the process is not on the secured list or if the registry key name is not on the rejection list, completing the request.

6. The registry monitoring system of claim 4 further comprising after modifying and deleting handles and values:
determining a process ID;
determining whether the process is secured by checking whether the process is on a secured process list;
if the process is not on the secured process list, completing the request; and
if the process is on the secured process list, not allowing the request to be completed.

7. A computer configured to monitor a registry according to a method comprising:
requesting a handle for a registry key to a calling process;
requesting a registry key value for the handle;
obtaining security clearance to complete the requests, wherein obtaining said security clearance includes:
(i.) determining a process ID and registry key value;
(ii.) determining whether the process is secured by checking a secured process list;
(iii.) if the process is secured, determining whether the registry key is on the rejection list;
(iv.) if the registry key is on the rejection list, denying the process access to the registry key value;
(v.) if the process is not on the secured list, completing the request;
(vi.) if the registry key is not on the rejection list and the process is on the secured process list, processing the value request and determining whether the value is on the rejection list;
(vii.) if the value is not on the rejection list, allowing the request to be completed; and
(viii.) if the value is on the rejection list, denying access to the registry key value; and
adjusting a threshold of at least one security clearance parameter, said threshold being adjustable in association with one or more of the requests.

8. The computer of claim 7 further comprising after requesting a handle for a registry key to a calling process:
determining a process ID and registry key;
determining whether the process is secured by checking a secured process list;
if the process is secured, determining whether the registry key is on a rejection list;
if the registry key is on the rejection list, denying the process access to the registry key; and
if the process is not on the secured list or if the registry key name is not on the rejection list, completing the request.

9. The computer of claim 7 further comprising after modifying and deleting handles and values:
determining a process ID;
determining whether the process is secured by checking whether the process is on a secured process list;
if the process is not on the secured process list, completing the request; and
if the process is on the secured process list, not allowing the request to be completed.

10. A machine-readable medium comprising a program to monitor a registry according to a method comprising:
requesting a handle for a registry key to a calling process;
requesting a registry key value for the handle;
obtaining security clearance to complete the requests, wherein obtaining said security clearance includes:
(i.) determining a process ID and registry key value;
(ii.) determining whether the process is secured by checking a secured process list;
(iii.) if the process is secured, determining whether the registry key is on the rejection list;
(iv.) if the registry key is on the rejection list, denying the process access to the registry key value;
(v.) if the process is not on the secured list, completing the request;
(vi.) if the registry key is not on the rejection list and the process is on the secured process list, processing the value request and determining whether the value is on the rejection list;
(vii.) if the value is not on the rejection list, allowing the request to be completed; and
(viii.) if the value is on the rejection list, denying access to the registry key value; and
adjusting a threshold of at least one security clearance permission, said threshold being adjustable in association with one or more of the requests.

11. The machine-readable medium of claim 10 further comprising after requesting a handle for a registry key to a calling process:

determining a process ID and registry key;
determining whether the process is secured by checking a secured process list;
if the process is secured, determining whether the registry key is on a rejection list;
if the registry key is on the rejection list, denying the process access to the registry key; and
if the process is not on the secured list or if the registry key name is not on the rejection list, completing the request.

12. The machine-readable medium of claim 10 further comprising after modifying and deleting handles and values:
determining a process ID;
determining whether the process is secured by checking whether the process is on a secured process list;
if the process is not on the secured process list, completing the request; and
if the process is on the secured process list, not allowing the request to be completed.

13. A computer implemented secured data transmission system having a receiver to access secured file content provided by a sender, wherein the receiver includes a registry monitoring system wherein the registry is monitored by a method comprising:
requesting a handle for a registry key to a calling process;
requesting a registry key value for the handle; and
obtaining security clearance to complete the requests, wherein a threshold of at least one security clearance parameter is adjustable via a system command in association with one or more of the requests, and wherein obtaining said security clearance includes:
(i.) determining a process ID and registry key value;
(ii.) determining whether the process is secured by checking a secured process list;
(iii.) if the process is secured, determining whether the registry key is on the rejection list;
(iv.) if the registry key is on the rejection list, denying the process access to the registry key value;
(v.) if the process is not on the secured list, completing the request;
(vi.) if the registry key is not on the rejection list and the process is on the secured process list, processing the value request and determining whether the value is on the rejection list;
(vii.) if the value is not on the rejection list allowing the request to be completed; and
(viii.) if the value is on the rejection list denying access to the registry key value.

14. The computer implemented secured data transmission system of claim 13 further comprising after requesting a handle for a registry key to a calling process:
determining a process ID and registry key;
determining whether the process is secured by checking a secured process list;
if the process is secured, determining whether the registry key is on a rejection list;
if the registry key is on the rejection list, denying the process access to the registry key; and
if the process is not on the secured list or if the registry key name is not on the rejection list, completing the request.

15. The computer implemented secured data transmission system of claim 13 further comprising after modifying and deleting handles and values:
determining a process ID;
determining whether the process is secured by checking whether the process is on a secured process list;
if the process is not on the secured process list, completing the request; and
if the process is on the secured process list, not allowing the request to be completed.

16. A registry monitoring system comprising:
at least one machine-readable medium for:
receiving a handle request for a registry key to a calling process; receiving a registry key value request for the handle; granting security clearance to complete the requests according to a method comprising:
(i.) determining a process ID and registry key value;
(ii.) determining whether the process is secured by checking a secured process list;
(iii.) if the process is secured, determining whether the registry key is on the rejection list;
(iv.) if the registry key is on the rejection list, denying the process access to the registry key value;
(v.) if the process is not on the secured list, completing the request;
(vi.) if the registry key is not on the rejection list and the process is on the secured process list, processing the value request and determining whether the value is on the rejection list;
(vii.) if the value is not on the rejection list, allowing the request to be completed; and
(viii.) if the value is on the rejection list, denying access to the registry key value; and adjusting a threshold of at least one security clearance permission by a system command, said threshold being adjustable in association with one or more of the requests.

17. The registry monitoring system of claim 16, further comprising denying security clearance when at least one security clearance permission is satisfied.

18. The registry monitoring system of claim 16, wherein said at least one security clearance permission is associated with the elapsed time since said handle or registry key value has been previously requested.

19. The registry monitoring system of claim 16, wherein said at least one security clearance permission is associated with the number of times said handle or registry key value has been previously requested.

20. The registry monitoring system of claim 16, wherein said at least one security clearance permission is associated with the date in which said handle or registry key value was previously requested.

21. The registry monitoring system of claim 16, wherein said at least one security clearance permission is associated with the accumulated time said handle or registry key value has been previously accessed.

22. The registry monitoring system of claim 21, wherein said previous access includes modifying and deleting keys and values of protected data locations.

23. The registry monitoring system of claim 16, wherein said at least one machine-readable medium includes at least one device driver.

24. A method of monitoring a registry comprising:
receiving a handle request for a registry key to a calling process;
receiving a registry key value request for the handle;
granting security clearance to complete the requests according to a method comprising:
(i.) determining a process ID and registry key value;
(ii.) determining whether the process is secured by checking a secured process list;

(iii.) if the process is secured, determining whether the registry key is on the rejection list;

(iv.) if the registry key is on the rejection list, denying the process access to the registry key value;

(v.) if the process is not on the secured list, completing the request;

(vi.) if the registry key is not on the rejection list and the process is on the secured process list, processing the value request and determining whether the value is on the rejection list;

(vii.) if the value is not on the rejection list, allowing the request to be completed; and (viii.) if the value is on the rejection list, denying access to the registry key value; and adjusting a threshold of at least one security clearance parameter, said threshold being adjustable in association with one or more of the requests.

25. The method of claim 24, further comprising denying security clearance when at least one security clearance parameter is satisfied.

26. The method of claim 24, wherein said at least one security clearance parameter is associated with the elapsed time since said handle or registry key value has been previously requested.

27. The method of claim 24, wherein said at least one security clearance parameter is associated with the number of times said handle or registry key value has been previously requested.

28. The method of claim 24, wherein said at least one security clearance parameter is associated with the date in which said handle or registry key value was previously requested.

29. The method of claim 24, wherein said at least one security clearance parameter is associated with the accumulated time said handle or registry key value has been previously accessed.

30. The method of claim 29, wherein said previous access includes modifying and deleting keys and values of protected data locations.

* * * * *